United States Patent [19]

Roese et al.

[11] 4,214,267
[45] Jul. 22, 1980

[54] STEREOFLUOROSCOPY SYSTEM

[76] Inventors: John A. Roese, 6315 Camino Corto, San Diego, Calif. 92120; A. Franklin Turner, 748 S. El Molino Ave., Pasadena, Calif. 91106

[21] Appl. No.: 854,259

[22] Filed: Nov. 23, 1977

[51] Int. Cl.$^2$ .............................................. H04N 9/54
[52] U.S. Cl. ..................................... 358/111; 358/88; 358/89; 358/92
[58] Field of Search ..................... 358/111, 88, 89, 91, 358/92

[56] References Cited

U.S. PATENT DOCUMENTS

| | | | |
|---|---|---|---|
| 2,730,566 | 1/1956 | Bartow | 358/111 |
| 2,865,988 | 12/1958 | Cafarelli | 358/89 |
| 3,076,054 | 1/1963 | Simon | 358/88 |
| 3,235,727 | 2/1966 | Shapiro | 358/111 |
| 3,598,032 | 8/1971 | Bohn | 358/92 |
| 3,992,573 | 11/1976 | White | 358/92 |

Primary Examiner—Howard W. Britton
Attorney, Agent, or Firm—Trask & Britt

[57] ABSTRACT

A stereofluoroscopy system has a source of radiation to radiate an object. The source may be one or two x-ray tubes. Conversion means receives radiation from the source and converts it into a composite video signal. The conversion means may include an image intensifier tube associated with a conventional television camera. The composite video signal is received by transmission means which may include switching apparatus and circuitry together with a video storage device to selectively receive even and odd fields for subsequent transmission to display means. The display means includes a television monitor to receive the video signal and a field synchronization detector to detect the video synchronization signal. Means are provided to transmit a synchronization signal to portable electro-optic shutter viewers to be positioned in front of the eyes of the viewer to obtain a three-dimensional stereoscopic view of the television monitor. Controller means are provided to supply control signals to the switching apparatus and circuitry in the transmission means. The controller means also provide control signals to position the source and conversion means as desired by the user. Cursor means may also be included to provide a three-dimensional cursor to be viewed by the user.

30 Claims, 16 Drawing Figures

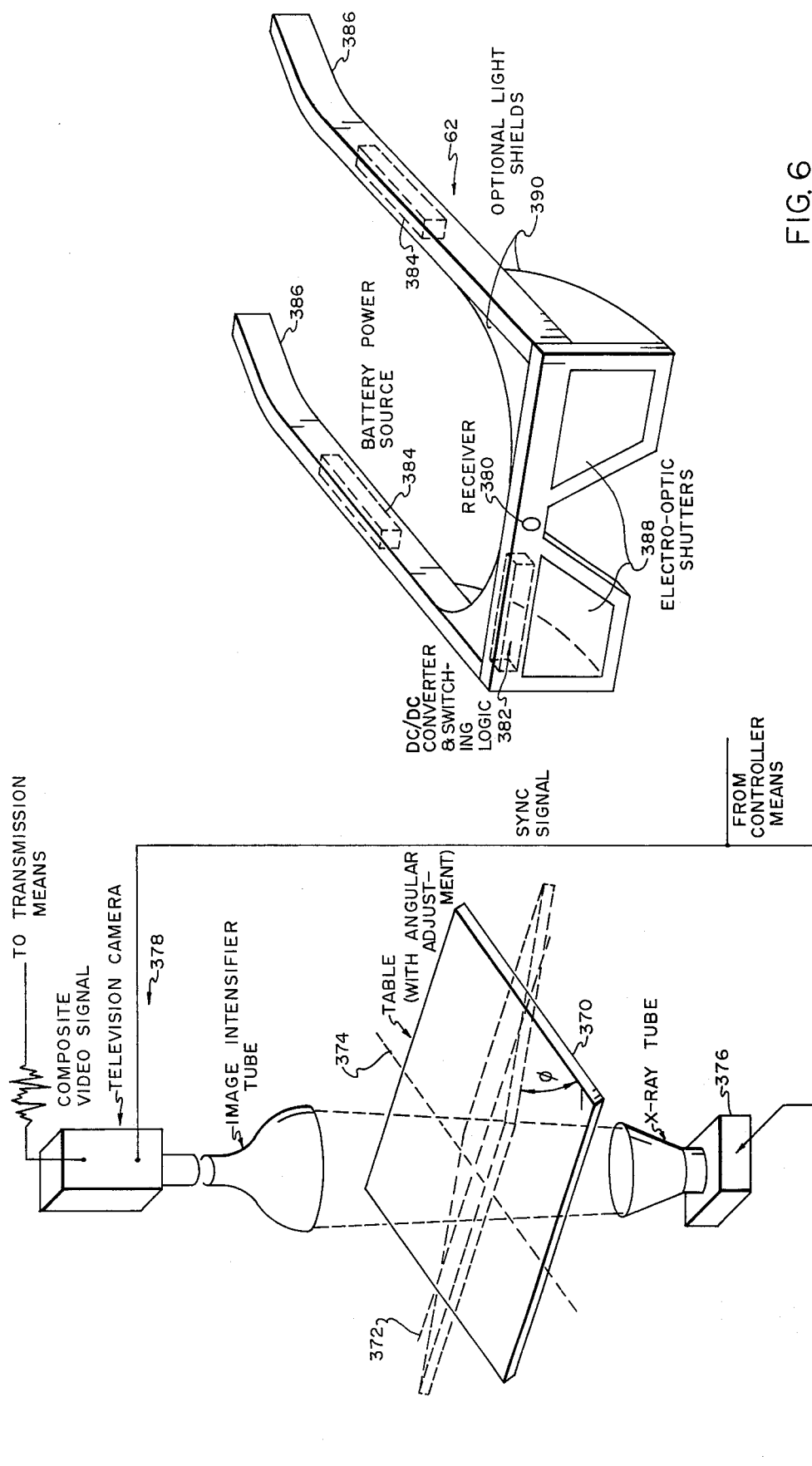

STEREOFLUOROSCOPY SYSTEM

BACKGROUND OF THE INVENTION

1. Field

This invention relates to stereoscopic visual systems. More particularly, this invention discloses an improved stereoscopic fluoroscopy system to provide three-dimensional visual presentations of fluoroscopic images.

2. State of the Art

Fluoroscopy techniques and apparatus are old and well known. See for example: U.S. Pat. No. 2,730,566 (Bertow et al). Attempts to obtain stereo or three-dimensional (3-D) images and particularly fluoroscopic stereo or 3-D images are known. U.S. Pat. No. 3,076,054 (Simon) discloses one such attempt using two sources of X-rays. A television system processes the X-ray images alternatingly received from the two sources into left and right video signals. The video signals are displayed to the viewer using polarization techniques. The left and right images are polarized differently and projected onto a screen using a half silvered mirror. The viewer wears simple polarized lenses in which the polarization is matched to the image polarization. The viewer orients his eyes (with the lenses) to permit simultaneous viewing of the left and right images on the screen to perceive a stereo type or 3-D type image.

Other attempts to produce a practical stereofluoroscopic system are also known. U.S. Pat. No. 3,309,519 (Euler, et al) discloses a system in which alternating color images developed from an X-ray source through television apparatus are displayed on a video screen. The viewer observes the images through color filter glasses to provide a stereo or 3-D perceived image.

The systems heretofore known have not achieved success or acceptance. Use of polarized glasses such as those disclosed by Simon force the viewer to maintain his eyes in a substantially fixed plane and orientation. Such constraints have proven to be impractical in that the viewer physically tires. As a result, the viewer either ceases to view after a short time or moves his head reducing the perceived quality of the presented image. Further, optical transmission is poor so that the perceived image is of poor quality. Use of color filters such as those employed by Euler et al has also been unsatisfactory. Distinct or narrow color filters are not practically available. As a result, the perceived image is of very poor quality. Representative color stereo photographs may be observed in M. Kunnen, *Electro-medica*, Siemeus Aktiengesellschaft 8520 Erlangen Henkestrasse 127 West Germany (1975 Vol. 1/75) at page 35 (stereo color filter viewing glasses included with publication). Eye strain and viewer distraction are typically experienced.

The advent of electro-optic light valves has rekindled interest in stereoscopic video systems. U.S. Pat. No. 3,821,466 (Roese) discloses a television system employing a light valve with a beam splitting device to act as a shutter mechanism for a television camera. Similar light valves are used by the viewer of a TV screen image to perceive the 3-D image. Lanthanum modified lead zirconate titante ceramics (PLZT) have also been used as light valves to achieve 3-D imagery. See U.S. Pat. No. 3,903,358 (Roese); c.f. J. A. Roese and A. S. Khalafalla, *Stereoscopic Viewing with PLZT Ceramics*, Ferroelectrics (Vol. 10, pp. 47–51) Gordon and Breach Science Publishers Ltd. (1976).

Prior to the use of light valves, various techniques have been disclosed to effect stereoscopic imagery. See, for example, U.S. Pat. Nos.: 3,527,880 (Gordon); 3,598,032 (Bohn); 3,858,001 (Bonne); 3,210,463 (Leenhardt); 2,696,523 (Theile); 3,621,127 (Hope); and 3,184,630 (Geer).

Although both stereoscopic video (e.g., TV) systems and stereo or 3-D fluoroscopic systems have been devised, practical 3-D or stereo fluoroscopic apparatus is yet unknown. Systems heretofore devised do not provide means to accommodate varying interocular separations of viewers or provide means to maximize perceived depth perception for particular objects. Further, known systems do not permit viewers to adjust perceived depth to the viewer's comfort. It may also be noted that many systems heretofore devised resort to optical or light beam splitting techniques [e.g., U.S. Pat. Nos. 3,903,358 (Roese); 3,821,466 (Roese); and 3,076,054 (Simon)] which significantly reduce clarity and resolution. That is, use of a beam splitter typically results in at least a 50% loss of light transmission with concomitant reduction in the quality of displayed and perceived image.

It may also be noted that no known stereofluoroscopic apparatus is available which provides the viewed with freedom of movement about the viewing device (e.g., TV screen), provides for multiple viewers and provides means and apparatus for the viewer to control the radiation delivered to the patient or object and the quality or character of the perceived image. Further, no known device is practically adaptable to existing two-dimensional fluoroscopy systems or which provides reverse or rear image perception means.

SUMMARY OF THE INVENTION

A stereoscopic fluoroscopy system includes a source of radiation to radiate an object and conversion means to receive the radiated images reflective of the object. The conversion means converts the images to a first electronic video signal and a second electronic video signal wherein each video signal is reflective of the object along respective lines of sight separated by a viewing angle. Transmission means are conductively connected to the conversion means to receive and transmit the video signals. Display means are conductively connected to the transmission means to receive the video signals and generate optically viewable images reflective of the object. The display means includes a conventional television monitor conductively connected to receive the video signals and generates the viewable images. A synchronization detector is conductively connected to the transmission means to also receive the video signals and detect the video signal synchronization. Means are conductively connected to the synchronization detector to transmit the sychronizational signal to a portable electro-optic shutter viewer having electro-optic shutters positioned approximate each eye of the viewer. Means are associated with respect to the portable electro-optic shutter viewer to alternately activate each electro-optic shutter in synchronization with said synchronization signal so that said viewer perceives a three-dimensional image.

In a preferred embodiment, positioning means are associated with the object, the source and the conversion means to selectively position the object and the source and the conversion means at a first position to generate a first image and in turn said first video signal reflective of said object. The positioning means then selectively positions the object, the source and the conversion means at a second position to generate a second image and in turn said second video signal. The first and second positions are selected to generate said images along respective lines of sight separated by the viewing angle. The system may also include a synchronization source conductively connected to the source of radiation and the conversion means so that synchronization signals are supplied thereto to cause substantially periodic preselected simultaneous operation thereof. A controller may also be associated with the positioning means to generate and supply positioning signals to the positioning means as selected by the user. The conversion means is preferably a television camera having odd and even field scans. The source of radiation is preferably an X-ray tube.

In another preferred embodiment, the transmission means includes a field detector conductively connected to receive the video signals and to detect the odd and even field scans and supply an odd and even field scan switch signal. Field scan logic receives the even and odd field scan switch signals and control signals from the controller to selectively transmit odd and even field scan switch signals as selected by the user. The field scan switch receives the video signals and receives the field scan switching signals to switch to supply even field scan signals from said first video signal and odd field scan signals from said second video signal. A video storage device is connected to receive the odd and even field scan signals and to supply an output video signal comprised of said odd and even field scan signals. The video storage device selectively stores said even and odd field scan signals until a new field scan signal is received from the television camera. A cursor means may also be provided and connected to the television monitor to generate a three-dimensional cursor for use by the viewer. Means may also be included to permit the user to reverse the perceived image.

BRIEF DESCRIPTION OF THE DRAWINGS

In the drawings, which illustrate the best mode presently contemplated for carrying out the invention:

FIG. 5 is a simplified partial diagram of another embodiment of a fluoroscopy system of the instant invention;

FIG. 6 is a perspective view of electro-optic viewers for use with the fluoroscopy system of the instant invention;

DESCRIPTION OF THE ILLUSTRATED EMBODIMENT

Figure 1:
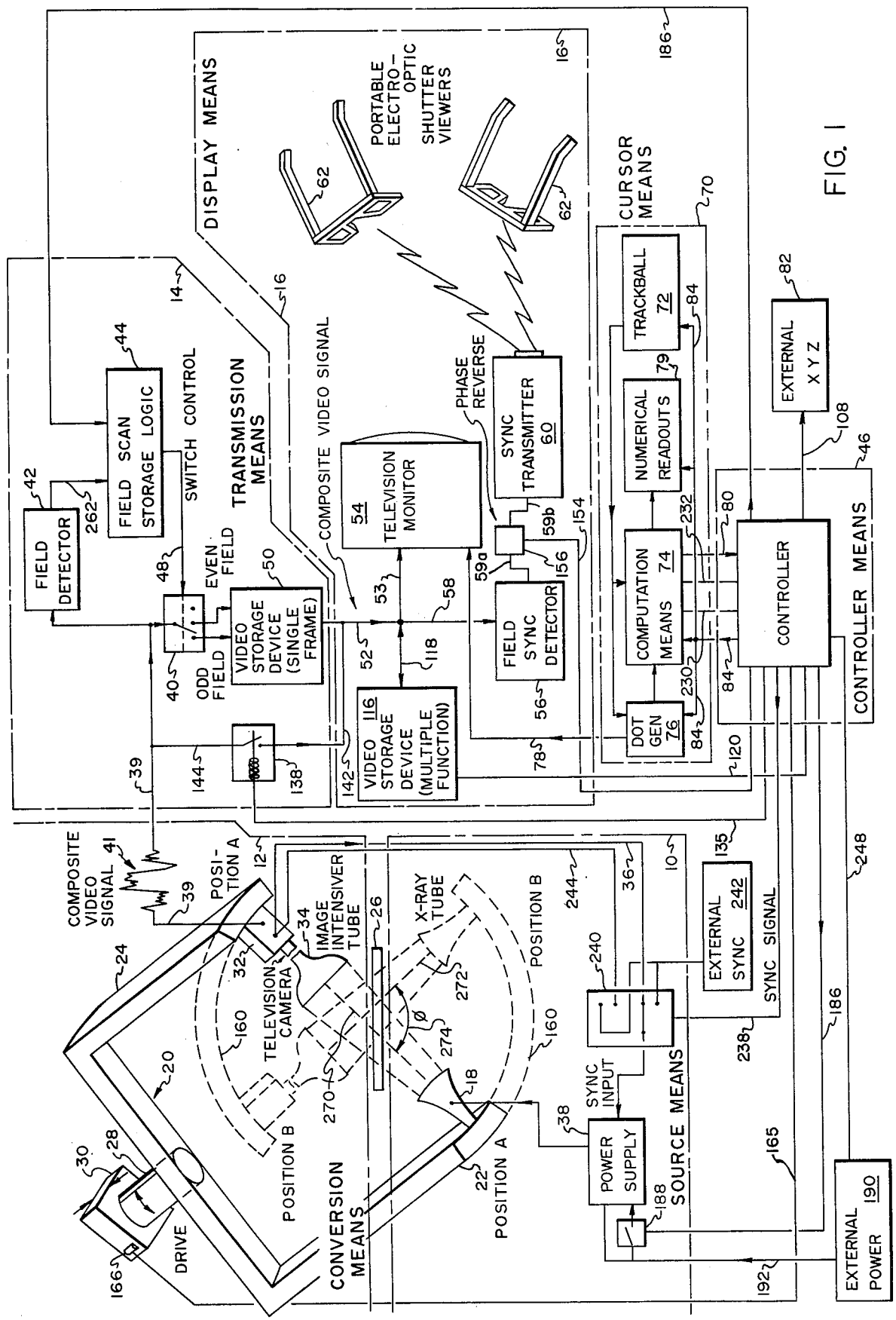
FIG. 1 is a block diagram of a stereofluoroscopy system of the instant invention.

Referring to FIG. 1, it can be seen that the stereofluoroscopy system of the instant invention has source means 10, conversion means 12, transmission 14, and display means 16. The source means 10, as here illustrated, is a conventional X-ray tube 18 affixed or adapted to what is known to those skilled in the art as a conventional C-arm fluoroscopy apparatus generally illustrated by the number 20. As can be seen from FIG. 1, the C-arm fluoroscopy apparatus has a lower arm 22 and an upper arm 24 with a table 26 mounted therebetween. A patient or other object may be placed on the table 26. The upper and lower arms 22 and 24 are connected to a shaft 28 which in turn is connected to drive means 30 which are adapted to constitute positioning means as more fully discussed hereinafter. The upper arm 24 has a conventional television camera 32 affixed thereto and an image intensifier tube 34 adapted to the television camera 32. The image intensifier tube 34 and television camera 32 are positioned opposite the X-ray tube 18 to receive radiation therefrom as it passes through the object positioned on the table 26. In other words, the TV camera 32 receives images reflective of the object being radiated by the X-ray tube 18.

As known to those skilled in the art, a conventional television camera has a synchronization generator therewithin to generate synchronization signals to be received by any receiving television monitor. As here indicated, the synchronization signal is extracted from the television camera 32 and supplied via conductor 36 to a power supply 38. The power supply 38 of the source means supplies power signals to the X-ray tube 18. The synchronization input is received by the power supply to supply activate or radiate signals to the X-ray tube 18 in synchronization with the television camera.

The television camera 32 supplies a composite video signal at its output which is conductively connected to the transmission means 14. The composite video signal is transmitted over conductor 39 which is any NTSC approved cabling capable of carrying a composite video signal as known to those skilled in the art. The conductor 39 is illustrated in wave form shape to symbolize the composite video signal 41. The television camera 32 is any NTSC approved 2-1 interlace black or white or color TV camera. The composite video signal is received by the transmission means 14 and supplied to a field scan switch 40 and a field detector 42. The field detector detects the odd and even field scans existing on the composite video signal. It supplies an odd and even field scan switch signal to the field scan storage logic 44. The field scan storage logic 44 receives an input from a controller 46 and supplies a field scan switching control signal via conductor 48 to the field scan switch 40. The field scan storage logic selects the odd and even field scans to be transmitted through the transmission means as selected by the user as more fully discussed hereinafter. The field switch 40 is shown as a simple pole switch controlled by the field scan storage logic 44. Those skilled in the art will recognize that any variety of switches may be used to accomplish the switching function as here described. An SCR switching device is within contemplation. It must be understood however that the switching device is intended to simply switch so that an odd and an even field are selectively transmitted to the video storage device 50.

The video storage device 50 receives odd and even field scans from the field scan switch 40 and stores the first signal (e.g., even field scan) that it receives and transmits it with the other field signal (e.g., odd field scan) and thereafter transmits a composite three-dimensional video signal to the display means 16. The video storage device preferably contains a single frame disk storage capability and may be readily available commercially as known to those skilled in the art. The video storage device has an automatic rewrite capability in that a new even field, for example, would write over the old even field previously stored on the disk. The output of the video storage device is therefore in a standard 2:1 interlace format and is transmitted via conductor 52 to the display means.

The display means 16, as herein illustrated, includes a conventional or standard television unit or television monitor 54. It receives the output of the video storage device 50 via conductors 52 and 53. A field synchronization detector 56 is conductively connected by conductor 58 to receive the output of the video storage device 50. The field synchronization detector 56 extracts the synchronization signal from the composite video signal associated with the field scan rate. As here shown, the field synchronization detector transmits that synchronization signal via conductor 59 to a synchronization transmitter 60. The synchronization transmitter 60 is here shown as a conventional single frequency low energy radio transmitter which transmits a pulse signal at a frequency preferably selected to minimize interference which may feed back into the video signal and in turn the television monitor 54. Appropriate isolation transformers and filters may be positioned between the field synchronization detector 56 and synchronization transmitter 60 as desired by the user to minimize any potential interference which may be caused by the synchronization transmitter 60.

As here shown, the synchronization transmitter 60 supplies an RF signal to portable electro-optic shutter viewers 62 which are more fully discussed hereinafter. The portable electro-optic shutter viewers 62 have electro-optic shutters for positioning proximate the eyes of a user. The viewer 62 contains means to receive the synchronization signal and to alternatingly activate and deactivate the shutters opposite the left and right eyes of the viewer to observe, in effect, the even field scan and the odd field scan as transmitted in the composite video signal to the television monitor 54 from the video storage device 50.

FIG. 1 also shows cursor means 70. The cursor means is comprised of a track ball device 72, computation means 74, a dot generator 76, and numerical readouts 78. The track ball device 72 is any conventional three-dimensional signal generator. Preferably it is a three-dimensional joy stick device which is commercially available as known to those skilled in the art. That is, it has a stick or handle which may be moved in a two-dimensional plane horizontally and vertically in a third direction. Sensors are associated with the movement to generate, in effect, the three-dimensional signals which are in turn supplied to the computation means 74 and the dot generator 76. The computation means 74 may be any known device capable of computing solutions of the mathematical formulas to develop the x, y, z coordinates as more fully discussed hereinafter. In particular, it may be a very small computer or a micro-processor commercially available as known to those skilled in the art. The dot generator 76 may be a rasterdot generator manufactured and presently commercially available from Colorado Video Corporation. The dot generator 76 is modified to write in odd and even field scans and to generate two horizontal displayed dots as desired by the user. The dot generator output is supplied to the television monitor 54 over conductor 78. The computation means 74 may supply an output to numerical readouts 79 which are conventional nixie tube readouts capable of displaying distance measurements as desired by the user. The computation means may also supply x, y, z coordinate position data via conductor 80 through the controller 46 to an external x, y, z numerical readout 82. The cursor means 70 receives control signals from the controller means 46 via conductors 84.

Figure 2:
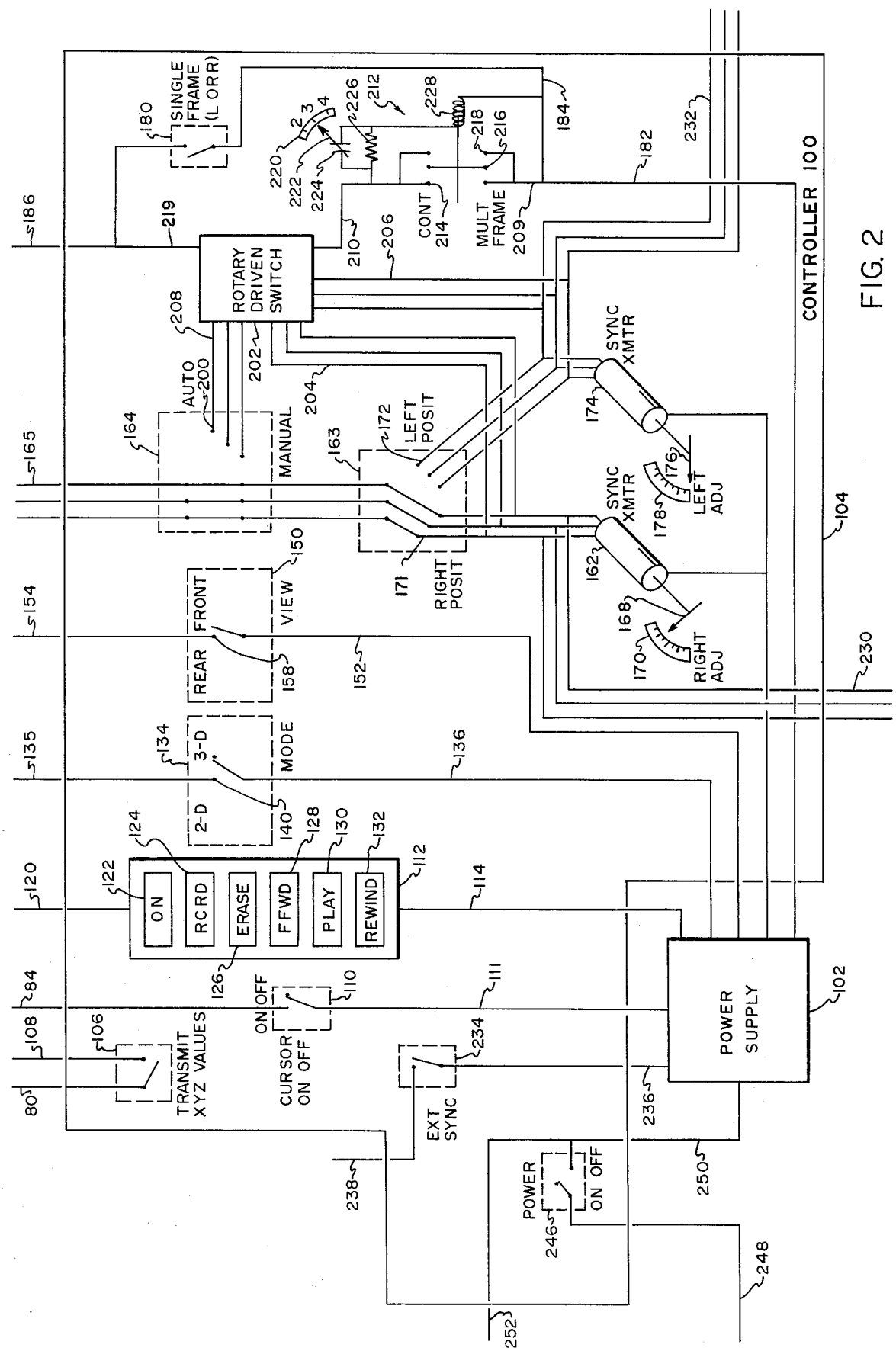
FIG. 2 is a simplified block and line diagram of a controller of the type for use with the fluoroscopy system of FIG. 1.

Referring now to FIG. 2, the controller means 46 is shown being comprised of a controller 100 and a power supply 102. The controller 100 is preferably contained within a chassis 104 having a multitude of controls for operation of the stereofluoroscopy system of the instant invention by the viewer. That is, the controller 100 is placed remotely proximate the television monitor 54 of the display means 16. The controller 100 has a switch 106 to transmit x, y, z values to the external x, y, z device 82 via conductor 108. The switch as herein shown is a simple single pole, single throw switch; but it may be any form of pushbutton or other switching device as desired by the user and as known to those skilled in the art. The controller 100 also has a cursor on-off switch 110 which receives power from the power supply 102 via conductor 111 and supplies power to the cursor means via conductor 84. The cursor on-off switch is here shown to be a simple single pole single throw switch. Those skilled in the art will recognize that any conventional switching device as desired by the user may be employed as the on-off switch 110. The controller 100 preferably includes a video storage device control panel 112. It receives power from the power supply 102 via conductor 114 and supplies control signals to a video storage device 116 (FIG. 1) optionally included with the display means 16. The video storage device 116 is any commercially available video tape recorder or video disk recorder to record multiple frames. It is conductively connected by conductor 118 to receive the composite video signal from the video storage device 50. The video storage device 116 receives control signals from the control panel 112 via conductors 120. The control panel has typical controls as shown in FIG. 2, such as on-off 122, record 124, erase 126, fast forward 128, play 130 and rewind 132.

The controller 100 also has a mode switch 134. The mode switch is here symbolized as a simple single pole single throw switch. However, those skilled in the art will recognize that any conventional switching device may be used as the mode switch 134. The mode switch receives power from the power supply via conductor 136 and supplies power via conductor 135 to activate a bypass switch 138 (FIG. 1). The bypass switch 138 may be any switch remotely activated to bypass the field switch 40 and video storage device 50. When the mode switch 134 is positioned at the 2-D position 140 (FIG. 2) the bypass switch 138 is activated to close and in turn supply the composite signal received from the television camera 32 via conductor 38 to conductor 52 via conductor 142 and 144. Accordingly, the viewer may select between the 2-D (two-dimensional mode) and 3-D (three-dimensional mode) of operation. A viewer may desire to select a two-dimensional mode in order to improve on resolution for a particular view. In multi-camera or multi-X-ray tube embodiments discussed hereinafter, the mode switch would also supply a signal to a remote switch to deactivate one camera and one X-ray tube as necessary so that one set of X-ray tube 18 and television camera 32 remain activatable to obtain the two-dimensional view.

The controller 100 also has a view switch 150. The view switch is here again symbolized as a simple single pole single throw switch which receives power from the power supply 102 via conductor 152 to supply a view modification signal via conductor 154 to a phase reverse device 156 (FIG. 1) conductively positioned between the field synchronization detector 56 and the synchronization transmitter 60. The phase reverse device 156 is a simple device which simply reverses the synchronization signal so that the left eye will observe the right image and the right eye will observe the left image as displayed by the television monitor 54 when the system is operating in the three-dimensional mode as selected by the mode switch 134. As shown in FIG. 2, the view switch is labeled rear and front. By reversing the phase of the synchronization signal being transmitted to the electro-optic shutter viewers 62 (FIG. 1) so that the eye perceives opposite camera views, the user or viewer will observe an image which appears to be taken from behind the object as opposed to in front of the object. That is, by the orientation of the x-ray tube, the television camera 32 will observe or transmit a picture showing, in effect, a particular view which may be said to be the front view of the object subjected to fluoroscopy. By operating the view switch from the front position to the rear position 158, the observer is presented with a picture which he perceives to be taken from behind or on the other side of the object from what he is viewing during front or normal operation. Such a capability allows the observer to visually construct in his mind's eye a better three-dimensional concept of the object under or subjected to fluoroscopy even though correct left/right relationships are not necessarily preserved.

The embodiment illustrated in FIG. 1 shows one X-ray tube 18 attached to a lower arm 22 and one conversion means comprised of an image intensifier 34 and television camera 32 attached to upper arm 24. The controller 100 contains controls to rotate the upper 24 and lower 22 arms from a first position labeled "position A" and a second position labeled "position B" through an arc as shown by the dotted lines 160. Movement may be effected by a variety of acceptable and available drive devices which may be controlled by the user through controls positioned on the controller. As illustrated in FIG. 2, the controls are comprised of a synchronous transmitter 162 to supply a signal through a right position and left position manual switch 163 and an automatic and manual switch 164 through conductors 165 to a synchronous receiver 166 positioned in and associated with the drive means 30 as selected by the user. The synchronous transmitter 162 has a manual pot 168 which may have a scale 170 labeled right adjust. The scale may be selected to be comparable in arc to the arc through which the arms 22 and 24 can rotate. By selective zeroing during initial set up, the user can thereupon adjust the arm 168 to the desired position (i.e., position A) which in turn would be transmitted through switches 163 and 164 via conductors 165 to the synchronous receiver 166 which in turn will drive the drive means 30 to cause the arms 24 and 22 to assume that particular angular position. By moving the left and right position switch from the right position 171 to the left position 172, alignment is made with a left adjustment synchro transmitter 174 having similarly an arm 176 and an index or scale 178. The operator may manually turn the left adjust arm 176 to the desired angular position (i.e., position B). The synchro transmitter in turn will cause a position signal to be sent through the position switch 163 and switch 164 via conductors 165 to the synchro receiver 166. The synchro receiver 166 will in turn cause the drive means 30 to move the arms 22 and 24 to the angular position B selected by the user.

When the manual-auto switch 164 is left in the manual position, it is necessary for the user to activate the single frame switch 180. The single frame switch 180 is shown as a single pole single throw switch. Those skilled in the art will recognize that any form of switch capable of making the connection may be used as a single frame switch 180. The single frame switch receives power from the power supply 102 via conductors 182 and 184 and when operated supplies a signal via conductor 186 to an activate switch 188 (FIG. 1). When activated, the activated switch 188 allows power to be received from an external power supply 190 via conductor 192 by the power supply 38 and in turn to be transmitted to the X-ray tube 18 to cause the X-ray tube to radiate and in turn cause the television camera 32 to receive an image which is in turn transmitted to the transmission means 14 to be observed by the viewer on the television monitor 54. The switch 188 is a timed switch (not shown) to cause a single television video signal (e.g., frame) to be taken. This in turn minimizes the amount of radiation a patient would receive if the patient were the object being subjected to fluoroscopy. When the manual auto switch 164 is transferred by the operator or viewer to the automatic position 200, automatic operation is effected. The right or position A position and the left or position B position, as set by the user on the respective arms 168 and 176, are transmitted to a rotary driven switch 202. The rotary driven switch is a rotating switch which makes contact between the right adjust conductors 204 and the left adjust conductors 206 and the auto conductors 208 to transmit alternatingly the right position (Position A) and the left position (Position B) to the synchro receiver 166 to in turn cause the upper 24 and lower 22 arms to rotate therebetween on a repetitive basis. The rotary driven switch receives power via conductors 182, 209 and 210.

A continuous and multiple frame switch is generally shown as 212. The continuous and multiple frame switch is any switch which will have a neutral position and a continous position and two other activating positions as shown. Movement between the first position 214 (continous position) and the second position 216 is manually affected by the operator. Movement between the second position 216 and a third position 218 is manually effected and automatically controlled as hereinafter described.

In operation if the viewer desires to have continuous updated fluoroscopy pictures taken by the apparatus of FIG. 1, the switch 164 is positioned in the automatic position and the continuous multi-frame switch 212 is positioned in the continuous 214 position. The rotary driven switch will in turn cause the arm 22 and 24 to move between the left and right position (Position A and Position B) on a repetitive basis. The rotaty switch has other contacts (not shown) which upon arrival of the arms 24 and 22 in position A will supply a signal via conductors 219 and 186 to the actuator switch 188 (FIG. 1) to activate to allow a single frame picture to be taken. Similarly, when the arms 22 and 24 reach the left position or position B, the activator switch 188 is activated to receive power from conductors 210, 219 and 186 through contacts of the rotary driven switch 202. If the operator desires to have a series of frames to be taken and then to have the system stop operation momentarily, he may select the number of frames desired, such as 2, 3 or 4 as shown on the index scale 220. An adjustable arm 222 associated with a variable capacitor 224 maybe used to select the number of frames to be taken. The variable capacitor 224 is selected (farad size) to allow continous operation over a period of time to allow the arms 22 and 24 to move from position A to position B and back to position A and back to position B as necessary to take the desired number of frames. The capacitor is positioned across a resistor 226 both of which are connected to a coil 228. When the capacitor is discharged the voltage across the coil changes to allow the continuous multi-frame switch 212 to return from position 218 multi-frame operation to position 216 which is stop operation.

The manual automatic switch 164, the right-left position switch 163, the continuous multi-frame switch 212, and the single frame switch 180 permit the operator to operate the system in a variety of different modes to minimize the radiation experienced by a patient being subjected to fluoroscopy. It may also be noted that the position A and position B information from the synchro transmitters 162 and 174, respectively, are sent to the computation means by conductors 230 and 232. Those skilled in the art will recognize that the electrical signals from the synchro transmitters 162 and 174 reflect position information and the difference thereof reflects the actual viewing angle φ.

The controller 100 also has an external synchronization switch 234. The external synchronization switch 234 is symbolized as a single pole single throw switch. Those skilled in the art will recognize that other forms of switches may be used to accomplish the switching function as described. The external synchronization switch 234 receives power from the power supply 102 via conductor 236 and supplies a signal via conductor 238 to a synchronizing switch 240 (FIG. 1). The synchronization switch 240 interrupts the synchronizing signal sent by the television camera 32 via conductor 36 to the X-ray tube power supply 38. It supplies in its stead a synchronization signal received from an external source 242. The external synchronization signal may be received from an electrocardiogram device which would be used to synchronize the frame taking or fluoroscopic picture with the systolic (contraction) phase and diastole (relaxation) phase of the heart. In this way, three-dimensional views of the heart or other organs related thereto may be observed based on the different phase of the heart pumping action. As can be seen in FIG. 1, the synchronization signal would be in turn supplied to the power supply 38 as well as to the television camera via conductor 244 to substitute for the internally generated television camera synchronization signal. The controller 100 also contains a power on-off switch 246. The power on-off switch 246 is symbolized as a simple single pole single throw switch. Those skilled in the art will recognize that a variety of different switches may be used as the power on-off switch 246. The power on-off switch receives power from the external power source 190 via conductor 248 and supplies power to the power supply 102 via conductor 250 and to the other equipment of the stereofluoroscopy system herein disclosed via conductor 252. The power connections are now shown as those skilled in the art will recognize that power must be distributed to operate the components thereof.

Figures 3, 4:
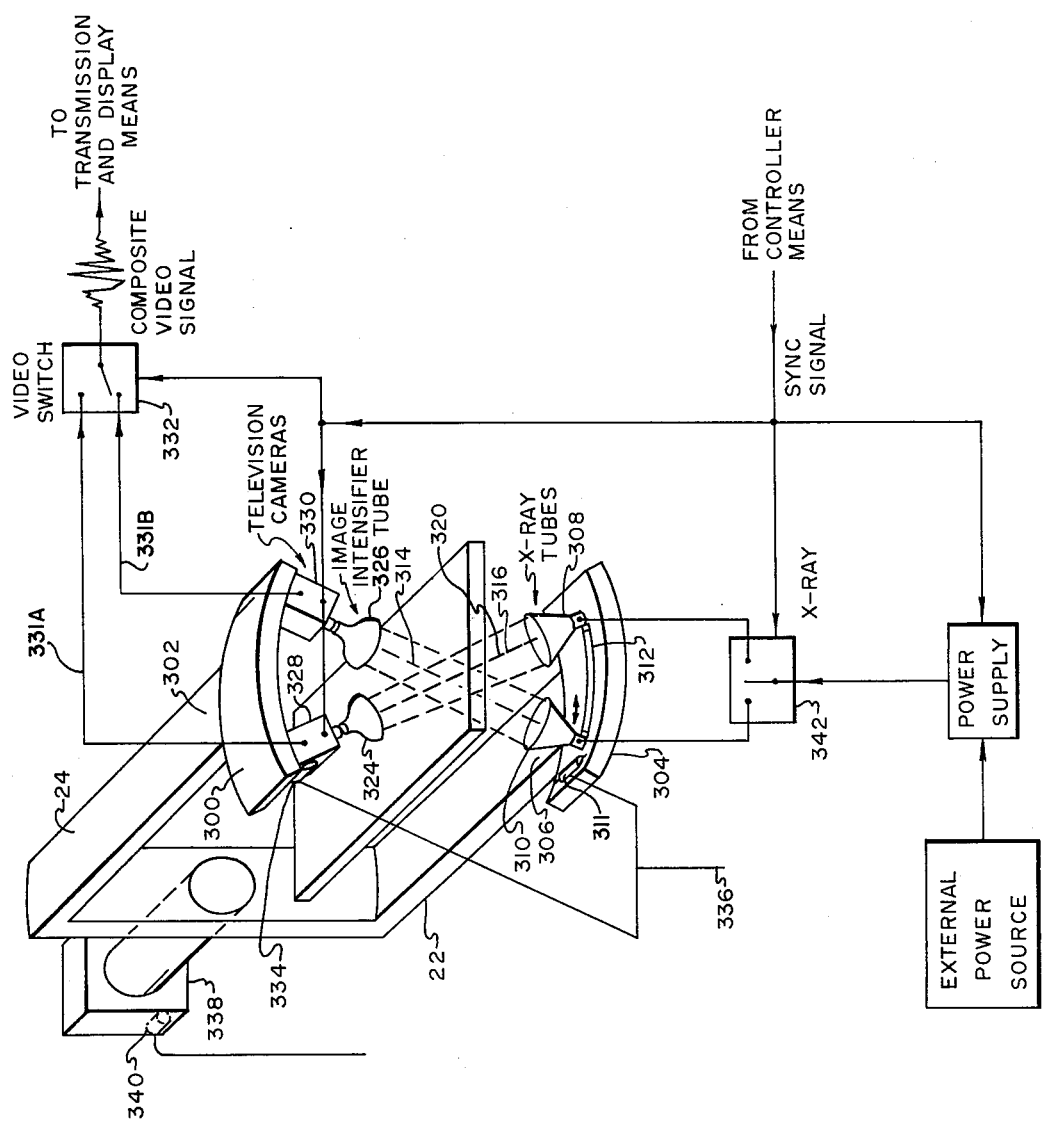
FIG. 3 is a simplified block and line diagram of field storage logic of the type for use with the fluoroscopy system of FIG. 1.
FIG. 4 is a simplified partial diagram of another embodiment of a fluoroscopy system of the instant invention.

It may also be noted that the activate output line 186 is also connected to the field storage logic 44. The field storage logic, which is best illustrated in FIG. 3, is shown as a simple summing amplifier 260 connected to receive the activate signal via conductor 186 and the field detector signal from the field detector 42 via conductor 262. In operation, the field detector 42 sends a field scan signal from the odd field which may be regarded as a plus two. When combined with the activate signal, which may be regarded as a plus one signal, the field switch 40 moves to the odd field contact. The field detector 42 sends a plus one signal to constitute or represent the existence of an even field signal. When the even field signal is combined with the activate signal in the summing amplifier 260, a representative plus two signal is sent to move the field switch 40 to the even field position. The absence of a field signal allows the switch 40 to move to a neutral contact unactivated so that the video storage device will not accidentally erase on the presence of a blank composite video signal being generated by the television camera 32. It may be noted that the representative figures (i.e., plus one, plus two, etc.) indicate voltages or other electrical values which may be used to operate the field scan switch 40 automatically. Those skilled in the art will recognize that a summing amplifier 260 may be selected to operate an electronic switch (such as a SCR) to perform the switching functions as herein described.

In operation, it can be seen that a first video signal unit (e.g., frame) is taken at a position A and a second video signal unit (e.g., frame) is taken at position B which may be selected by the user. The respective lines of sight 270 and 272 form a video angle which separates them. As shown in FIG. 1, the video angle is labeled φ.

Referring to FIG. 4, two X-ray tubes 308 and 310 are positioned opposite each other on a track 312. A synchro motor/receiver 311 is associated with one of the two X-ray tubes 310 to cause it to be moved along the track 312 as desired by the user. Appropriate control for the synchro motor/receiver 311 to cause the X-ray tube to move are optionally positioned on the chassis of a remotely located controller comparable to the chassis 104 of the controller 100. Movement of one of the X-ray tubes 310 with respect to the other X-ray tube 308 will change the respective lines of sight 314 and 316 to vary the video angle 320 or angle of separation between two lines of sight. This angle is also referred to as φ (theta). Two receiving conversion apparatus comprised of an image intensifier 324 and 326 and television cameras 328 and 330 are also provided. The television cameras transmit a composite video signal via conductors 331A and 331B to a video switch 332 which in turn selectively transmits from each of the cameras 328 and 330 to transmission means comparable to transmission means 14 shown in FIG. 1. The television cameras 328 and 330 and image intensifiers 324 and 326 may be similarly placed upon a track comparable to that shown for the X-ray tubes as desired. One television camera may be moved with respect to the other television camera by an appropriate synchro motor/receiver 334 receiving an appropriate synchronous transmitter signal from controller means via common conductor 336. As shown in FIG. 4, the synchro motor/receivers 311 and 334 both receive the same positioning signal via conductor 336 so that the intensifiers 324, 326 keep the same orientation to the X-ray tubes 308, 310. The drive means 338 is similar to the drive means illustrated and disclosed in FIG. 1 and may have a synchro receiver 340 to receive positioning signals from a controller means as hereinbefore disclosed.

As shown in FIG. 4, an external synchronization signal is preferably supplied to operate the video switch 332, the X-ray switch 342 and the respective television cameras 328 and 330 in synchronization. Operation of the device disclosed in FIG. 4 is comparable to that of FIG. 1. However, positioning of the single X-ray tube and the single camera of FIG. 1 by rotating the entire arms 22 and 24 structure is not necessary. It may also be noted that the transmission means 14 processes the composite video signal so that for two consecutive field scans, one taken at time 1 and one taken at time 2, the field scans and electro-optic shutters may be coordinated in operation as shown in the following table.

TABLE

|  | TIME 1 | TIME 2 |
| --- | --- | --- |
| Left TV Camera Field Scan | EVEN | ODD |
| Right TV Camera Field Scan | EVEN | ODD |
| Transmission Means Output To TV Monitor | EVEN (L) | ODD (R) |
| Shutter for Left Eye | OPEN | Closed |
| Shutter for Right Eye | Closed | OPEN |
|  | 1/60 sec. | 1/60 sec. |

Where the underlined items are the accepted and operative information units synchronized together for each time occurrence.

Referring now to FIG. 5, an alternate embodiment is disclosed. In operation, it is comparable to the system disclosed and illustrated in FIG. 1. However, the table 370 is moveable, as here shown, about its longitudinal axis 372. It may also be rotated about its narrow axis 374. If a patient is positioned upon the table 370, the patient may be rotated with respect to the X-ray tube 376 and the conversion means generally indicated by the number 378 to provide the two different views necessary to effect a stereoscopic image on the television monitor.

Figure 7:
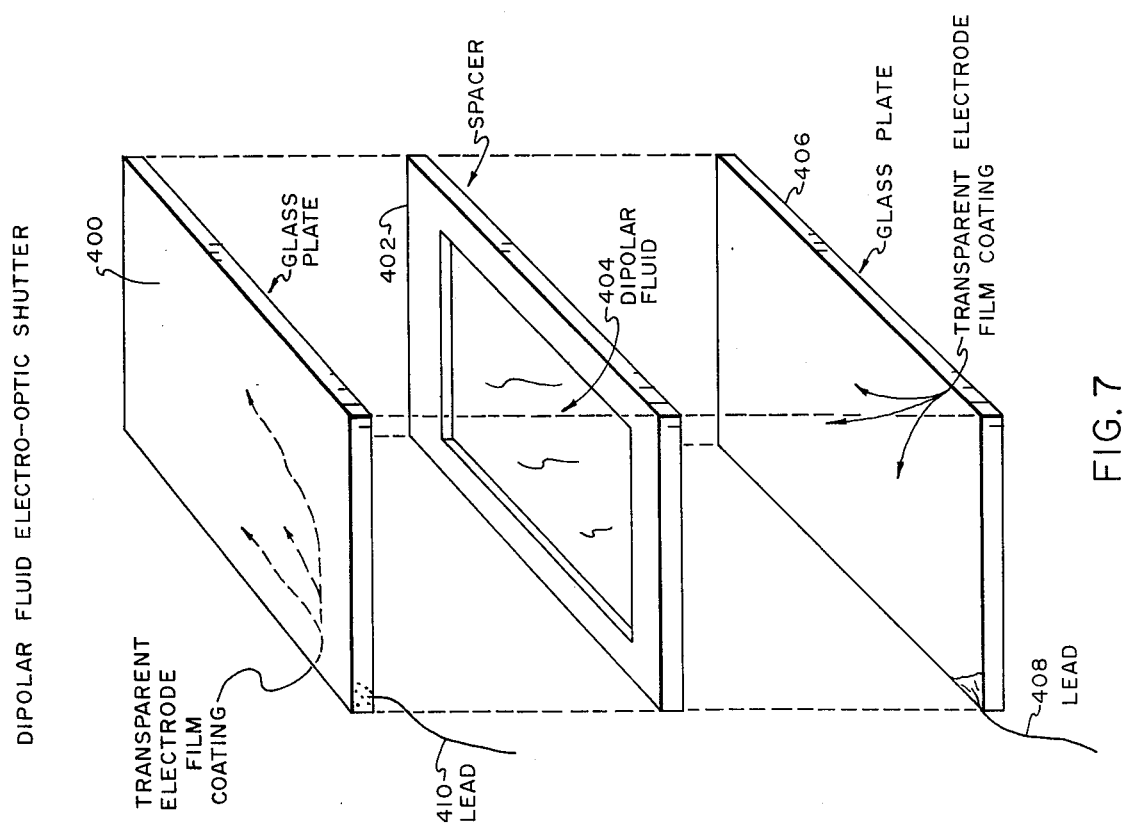
FIG. 7 is a perspective broken apart view of a dipolar fluid electro-optic shutter for use with a fluoroscopy system of the instant invention.

Referring now to FIG. 6, electro-optic shutters 62 are illustrated in more detail. In particular, the shutters contain a receiver having an antenna to receive an RF signal from the synchronization transmitter 60 (FIG. 1). The receiver 380 is conductively connected to the DC to DC converter and switching logic 382 which receives the synchronization signal and electric power from batteries 384 stored in the stem 386 of the viewing apparatus 62. The converter and switching logic 382 sends electrical signals to the electro-optic shutters positioned as eye pieces 388 in the viewer for positioning proximate the eyes of the user. Optional light shields 390 may be positioned to block ambient light and improve the viewing capability of the user. Alternatively, the sync transmitter 60 could be connected by an electric wire to supply its own power and a switching signal to the electro-optic shutters as more fully disclosed in U.S. Pat. Nos. 3,821,466 (Roese) and 3,903,358 (Roese). The electro-optic shutters 388 may be nematic crystal devices as disclosed in U.S. Pat. No. 3,821,466 (Roese) or a lead lanthanum zirconate titanate ceramic material such as that disclosed in U.S. Pat. No. 3,903,358. Alternately dipolar fluid electro-optic material may be used as better illustrated in FIG. 7. As shown in FIG. 7, the electro-optic shutters may be comprised of a glass plate 400, spacer 402 with a dipolar fluid 404 therebetween and a backing glass plate 406. Both glass plates 400 and 406 have transparent electrode film coatings positioned thereon which are conductively connected by electric leads 408 and 410 to, for example, the DC to DC converter and switching logic 382 of the viewer 62. Alternating electrode signals cause the dipolar fluid to switch between clear and opaque translucent characteristics to permit viewing comparable to that as disclosed with respect to the PLTZ liquid crystal shutter devices.

Figure 8:
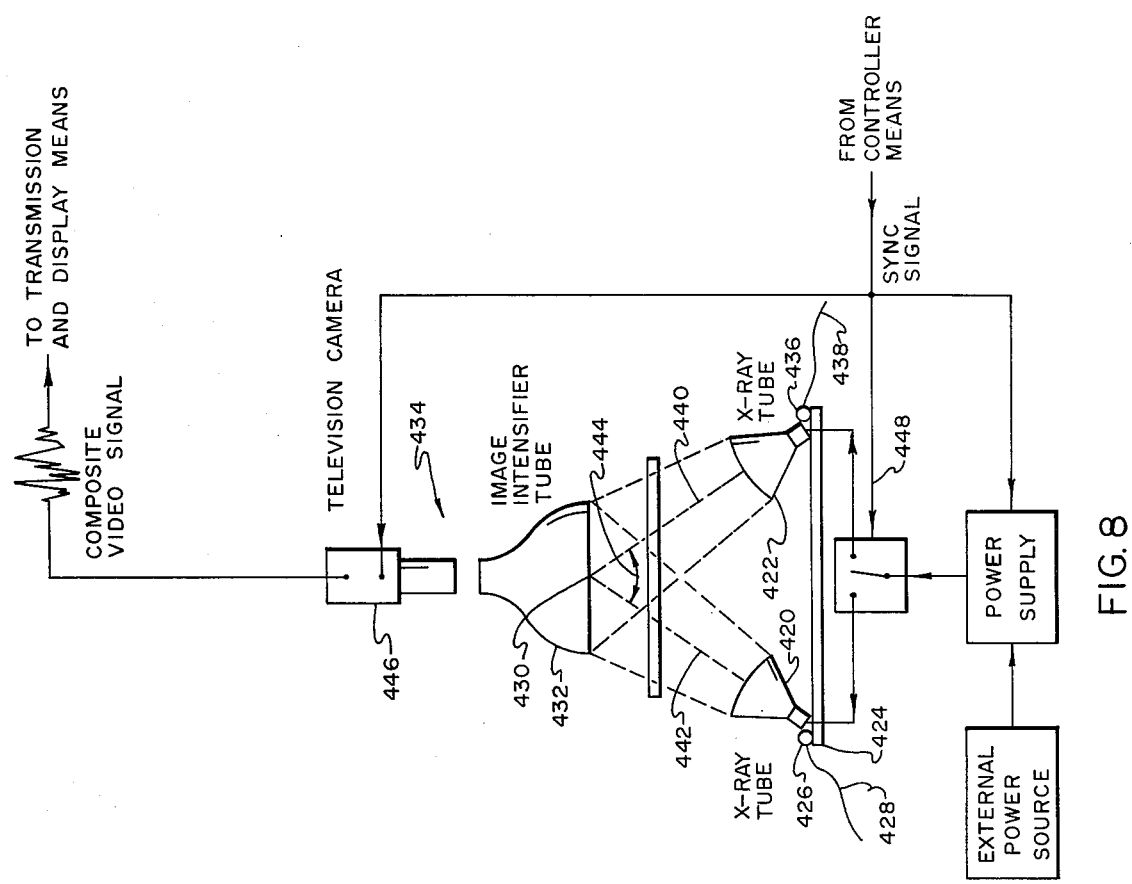
FIG. 8 is a simplified partial diagram of another embodiment of the fluoroscopy system of the instant invention.

Referring now to FIG. 8, another alternate embodiment is shown for stereofluoroscopy. In particular, two X-ray tubes 420 and 422 are shown mounted to a track 424. A synchro receiver 426 is shown associated with X-ray tube 420 to receive signals from conductor 428 to cause the X-ray tube 420 to move along the track 424 as indicated pursuant to signals received from a controller means comparable to the controller 100 (FIG. 1). A cam arrangement may be used to cause the X-ray tube to maintain a line of sight to impact the center 430 of the image intensifier 432 of the conversion means which is generally indicated by the numeral 434. The other X-ray tube 422 may also have a synchro receiver 436 associated therewith to receive signals from a controller via conductor 438 to similarly cause it to move along the track 424. A cam arrangement may also be used to cause the X-ray tube 422 to maintain a line of sight to impact the center 430 of the image intensifier 432. It may be noted that the lines of sight 440 and 442 form a video angle 444. The video angle 444 is also a viewing angle sometimes designated herein as φ (theta). The composite video signal is transmitted by the television camera 446 to the transmission and display means as hereinbefore described. A synchronization signal may be received from a controller or an external source via conductor 448 to cause alternating activation of the X-ray tubes 422 and 420.

Figure 9:
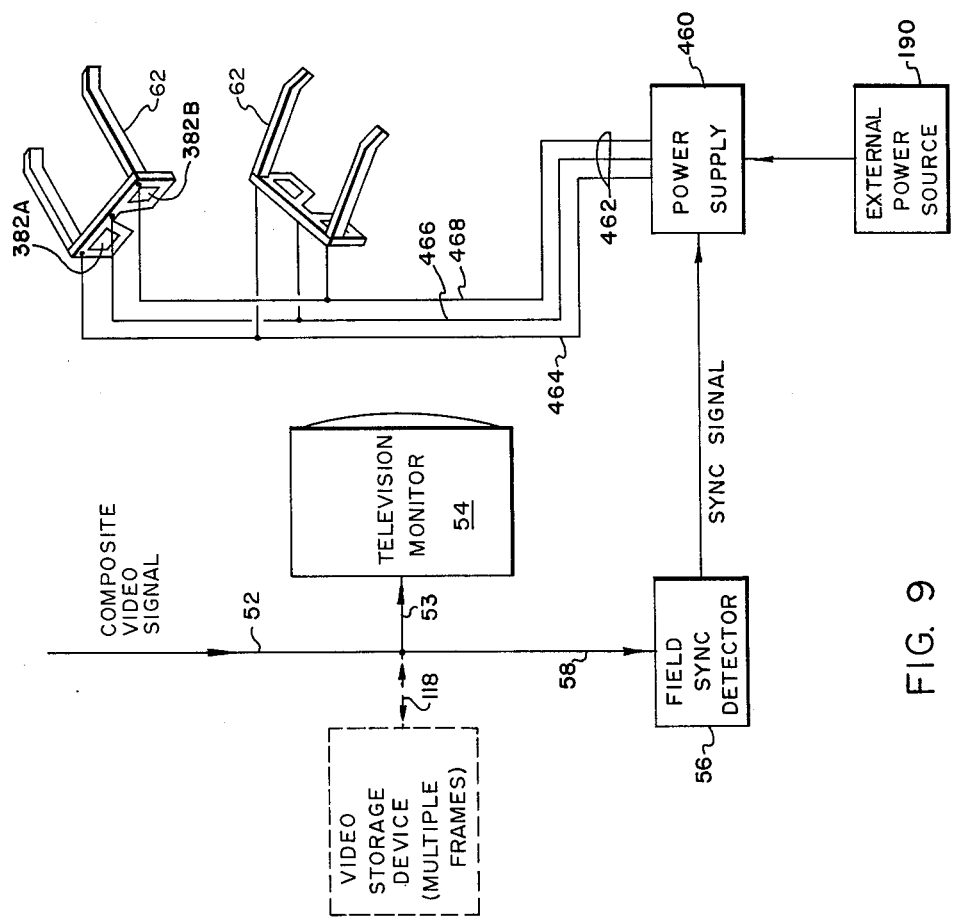
FIG. 9 is a partial simplified diagram of a fluoroscopy system of the instant invention employing conductor means to activate electro-optic viewers.

Referring now to FIG. 9, an electrical connection device for the viewer 62 is shown as hereinbefore discussed to be used in lieu of the sync transmitter 60 shown in FIG. 1. The field synchronization detector 56 supplies a synchronization signal (reflecting odd/even scan) to a power supply 460. The power supply 460 is powered from an external source such as the external power supply 190 of FIG. 1. The power supply 460 supplies switching signals via conductor means 462 shown comprised of three separate conductors 464, 466 and 468. The center conductor 466 acts as a common with the conductors 464 and 468 acting as signal lines over which alternating electrode signals are sent to operate first one eye piece 382A and then the other 382B in relation to the odd and even scan synchronization signals. Thus, one eye piece 382A and the other 382B are operated to be alternatingly substantially transparent and opaque and allow the user to view an image on the monitor 54.

Figure 10:
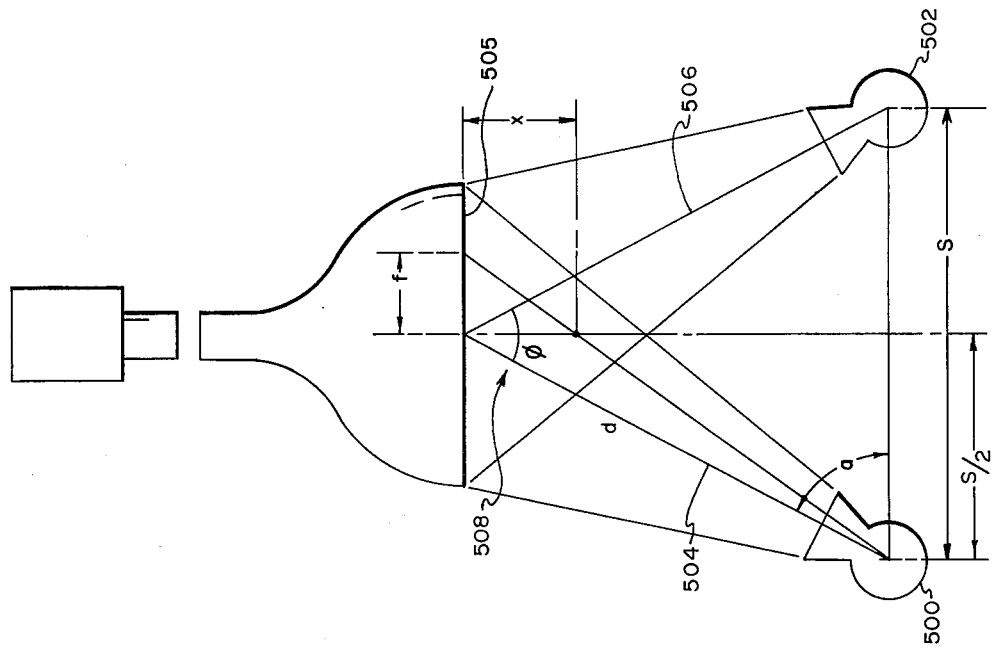
FIG. 10 is a line diagram of a mathematical model of a fluoroscopy system of the instant invention.

Referring now to FIG. 10, a simplified source and conversion means is shown in order to illustrate the computations necessary to be performed by the computation means 74 of the cursor means 70 (FIG. 2) when a three-dimensional cursor is provided. In particular, two X-ray tubes 500 and 502 are shown each having a line of sight 504 and 506 forming a video angle 508. The distance X is the displacement distance in front of the image intensifier tube surface 505. It relates to the trigonometry of the two images generated (one by tube 500 and one by tube 502, or by the same tube moved to different locations) by the source and conversion means in accordance with the following relationships:

$$X = \frac{d \sin a}{1 + \frac{S/2}{f}} \quad (1)$$

Where:
X = amount of displacement in front of image intensifier tube surface 505 corresponding to a given horizontal displacement r on the monitor 54 (FIG. 12).
d = distance from source to center of image receiving device.
S = horizontal displacement distance between sources set by operator.
a = complimentary angle of $\phi/2$.
f = displacement factor as per the relationship.

$$f = (\text{alpha})(r) \quad (2)$$

Where:
alpha = The magnification or reduction factor empirically developed to account for curvature of lenses and other optical factors.
r = Horizontal displacement on TV screen 549 (FIG. 12) corresponding to displacement distance X in front of intensifier tube surface 505.

Figure 11:
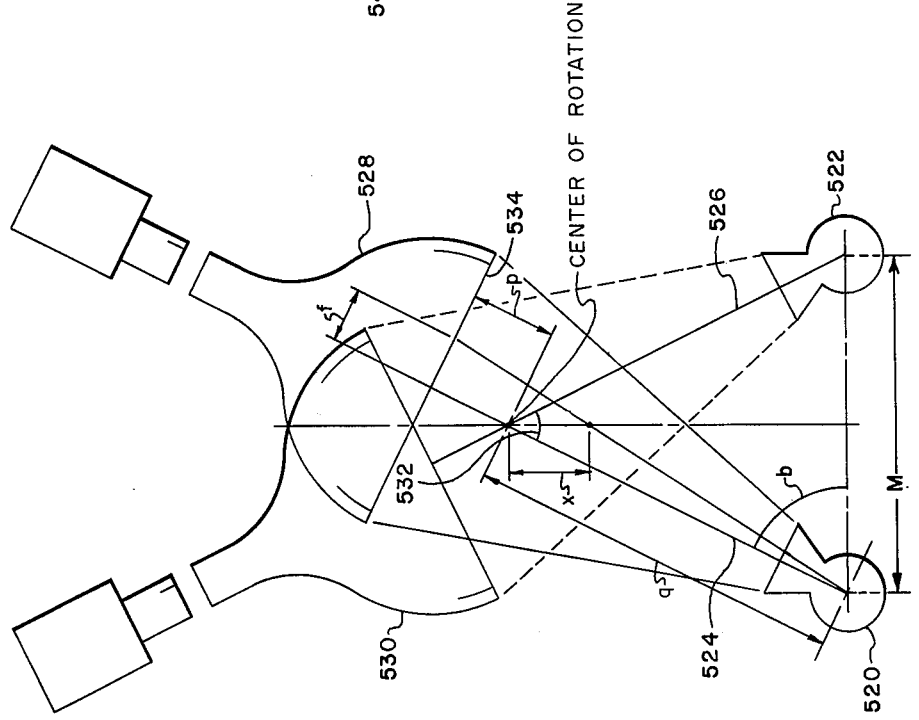
FIG. 11 is another line diagram of a mathematical model of a fluoroscopy system of the instant invention.

FIG. 11 represents an alternate mathematical model. In FIG. 11, a first source 520 and second source 522 radiate along respective lines-of-sight 524 and 526 to respective conversion means having image intensifiers 528 and 530. In this model, the distance X is defined by the relationship:

$$X = \frac{q \sin b}{1 + \frac{M/2}{t}} \quad (3)$$

Where:
X = displacement in front of or behind center of rotation.
q = distance from X-ray tube source to center of rotation of lines of sight.
M = horizontal displacement distance between sources set by operator.
b = the complimentary angle of ½ the viewing angle.

and where t is defined by the relationship:

$$t = \frac{f}{(1 + p/q) \cos b} \quad (4)$$

Where:
t is a displacement factor;
p is distance of center of rotation from face 534 from face 534 of image intensifier; and
b, f and q are defined above.

Figure 12:
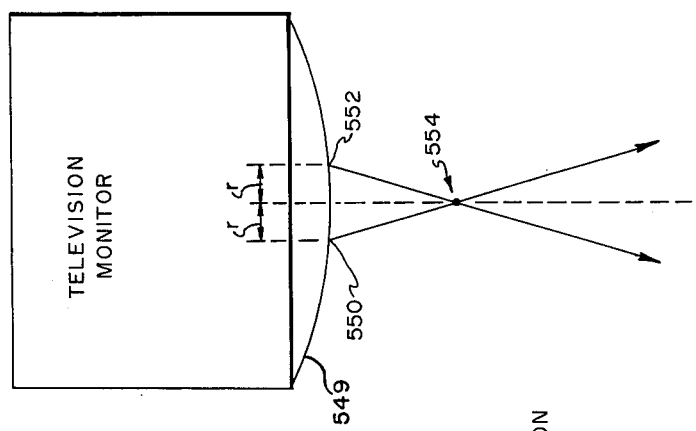
FIG. 12 is a top view of a television monitor showing mathematical model symbols related to the use of a cursor.

In relationship (2), alpha is an empirically developed magnification factor to account for the curvature of the lens of the intensifier tube, the TV camera and the TV monitor. It also takes into account other optical factors associated with the system and is empirically developed by experimentation. The dot generator 76 (FIG. 2) generates two dots at locations 550 and 552 as shown in FIG. 12 to generate an image viewed by the user through viewers 62. The computation means 74 is programmed to compute the distance X as per the above relationship and compute distances in an x, y and z coordination system and to provide three-dimensional cursor which in turn reads out the distance from a center point or the difference in width or dimension as desired by the user. Programming any of the selected computation means to compute the distances can be simply effected using the formulas disclosed.

It may be noted that the video angle or viewing angle as illustrated in the various embodiments herein is adjustable. Many viewers, particularly viewers with age do not have eye muscles sufficient to adjust to the three-dimensional images if the angle were not to be adjustable. Accordingly, the viewer can adjust the video angle to provide a comfortable viewing picture in three dimensions. In some circumstances, some viewers may adjust the angle to develop a maximum available depth perception to facilitate an understanding or to facilitate obtention of knowledge from the images that are being displayed in three dimensions.

Figure 13:
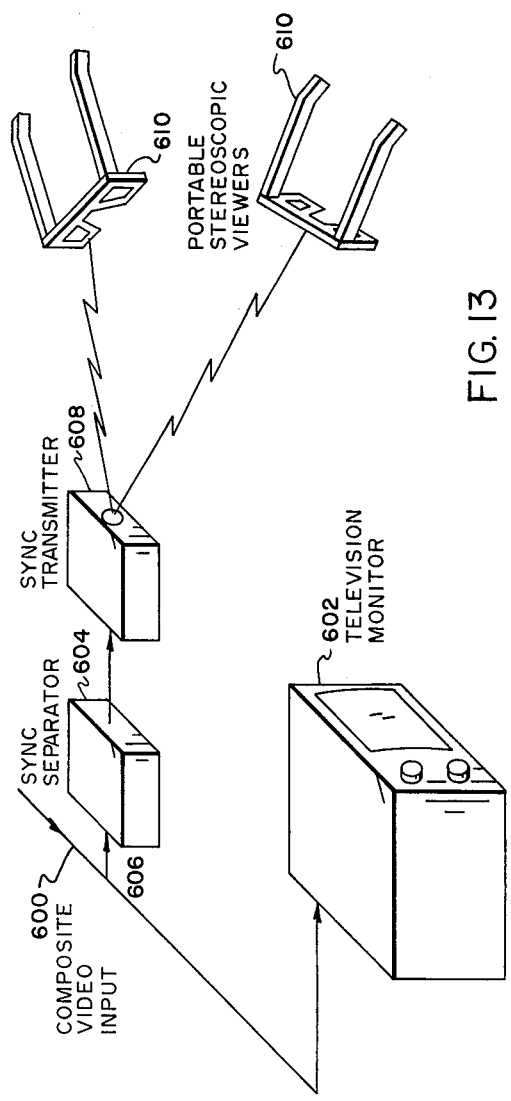
FIG. 13 is a simplified partial perspective view of a stereoscopic fluoroscopy system of the instant invention.

Many different applications for the present invention exist. For example, FIG. 13 is a simplified partial perspective diagram of a television receiver system of a stereofluoroscopy system which employs the portable stereoscopic viewer for stereoscopic viewing. In this system, a standard composite video signal is received on conductor 600 and used to drive television monitor 602. The television monitor is not modified in any way and is operated in a conventional 2:1 interlace raster scan mode. The composite video signal is also fed into synchronization pulse separator module 604. The function of module 604 is to extract vertical synchronization pulses from the composite video input signal. Circuit designs which would be suitable for synchronization pulse separator module 604 are well known in the video arts as the separation of both vertical and horizontal synchronization pulses is basic to the operation of television receivers. In conventional television systems with 2:1 interlace, a field rate of 60 fields per second is employed to eliminate the effects of flicker. For a 2:1 interlace system, the corresponding frame rate is then 30 frames per second. Since a vertical retrace scan occurs once for each field, the pulse stream extracted by vertical synchronization pulse separator module 604 has a frequency of 60 pulses per second.

Once the stream of vertical synchronization pulses has been extracted, it is necessary to transmit them to a remote receiver. Transmission of the vertical synchronization pulses is performed by synchronization pulse transmitter 608. Methods for transmission of the vertical synchronization pulses include radio frequency, telemetry, acoustical and optical means. Conventional telemetry means would be preferred in most applications, although special conditions, such as operating in an area of high electrical interference, might necessitate use of alternate means for transmission. Amplification or other normal signal preconditioning techniques may be required prior to transmission of the vertical synchronization pulses.

In the normal operating mode for the system of FIG. 13, a time sequence of alternating odd and even numbered line fields is transmitted via a video link to television monitor 602 for display. The received odd and even numbered line fields are displayed on monitor 602 in the normal field sequential manner employed with conventional interlace raster television systems.

For an observer to see three-dimensional images on television monitor 602, it is necessary to use an electro-optic shutter stereoscopic viewer 610. In stereoscopic viewer 601, the pair of electro-optic shutters function as electronic optical light valves which are 180 degrees out of phase with 50% duty cycles. When sufficient voltage potential is applied to the PLZT shutter electrodes, transmitted light experiences a near ninety degree rotation. This effect is electronically controllable and, when optically coupled with high contrast front and rear polarizers of crossed axes of polarization, results in a highly effective optical shutter. Transition times from maximum to minimum and minimum to maximum optical transmission states of less than one millisecond have been obtained in operating models employing PLZT ceramics. Voltage potentials of four hundred to five hundred volts DC have been successfully used to drive the PLZT optical shutters.

The operation of stereoscopic viewer 610 is synchronized with the field scan synchronization pulse of television monitor 602. When viewing television monitor 602, the shutter 624 and 626 of stereoscopic viewer 610 which corresponds to one perspective image is open for the duration of one field scan while the other shutter is closed. When the next field scan occurs, the previously closed shutter is opened and the shutter which previously was open is closed. This permits the observer to sequentially view stereoscopically complementary perspective images. Repetition of this sequence at normal field rates, e.g., sixty fields a second, allows the observer to merge the alternating perspective images into a single three-dimensional image.

A receiver for the transmitted vertical synchronization pulses is contained within the housing for each portable PLZT electro-optic shutter stereoscopic viewer 610.

Figure 14:
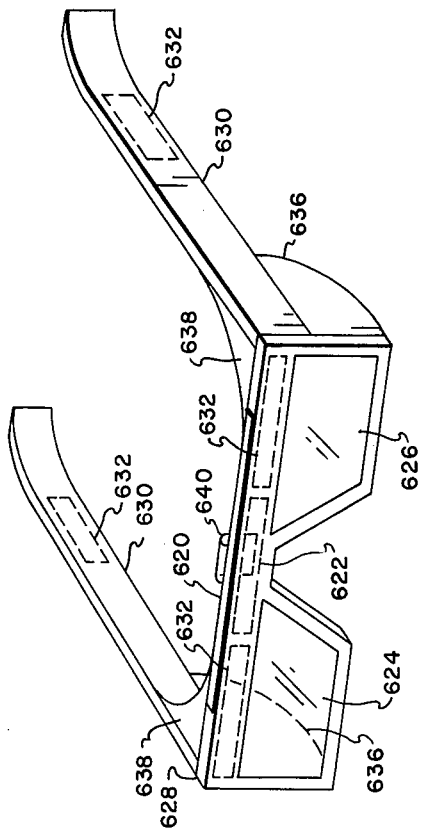
FIG. 14 is a perspective view of portable electro-optic viewers for use with fluoroscopy systems of the instant invention.

A more detailed view of the portable PLZT electro-optic shutter stereoscopic viewer is shown in FIG. 14. In this figure, a receiving antenna 620 is shown for pickup of telemetry signals for synchronization pulse transmitter 608. Of course, if the mode of signal transmission is acoustic or optical, antenna 620 would be eliminated and appropriate acoustically or optically sensitive pickup devices would be employed instead.

The necessary circuitry 622 for receiving the vertical synchronization pulses and for switching the viewer's electro-optic shutters 24 and 26 is known to the prior arts. For the portable stereoscopic view 610, this circuit is shown located in the frames 628 of stereoscopic viewer 610. If packaging size requires, a part or all of the receiving and switching circuitry could be located in stems 630.

The power source necessary to switch electro-optic shutters 624 and 626 is derived from one or more batteries 632. In FIG. 14, batteries 632 are shown as being contained within the stems 632 of the stereoscopic viewer housing. Alternate battery locations are also shown. The batteries 632 may also be positioned in the front piece 634 of the viewer 610. To achieve a lightweight assembly for stereoscopic viewer 610, the batteries must be as small as practical. Batteries which could be recharged in place would be preferable to batteries requiring removal when depleated.

The complete housing for the electro-optic shutter stereoscopic viewer 610 is sufficiently lightweight so as to allow the viewer to be worn as a pair of glasses. An alternate implementation more suitable for an observer who normally wears eyeglasses would be to eliminate stems 630. Thus, the stereoscopic viewer could then be attached to the eyeglass frames in the same manner as a pair of clip-on sunglasses. The frames 28 of the stereoscopic viewer can be of a plastic, hard rubber, or other suitable material and serve to give structural support for the viewer lenses 624 and 626. Optional additions to the basic stereoscopic viewer frames are removable side panels 636 and top panels 638 which serve to block background light and reduce reflections from the inside surface of the viewer shutters.

For purposes of attaching the stereoscopic viewer 610 to standard eyeglasses frames, a spring tension clip 640 can be used as illustrated in FIG. 14. A hinge modification of clip 640 may be incorporated to allow the clip-on stereoscopic viewer to flip up out of the observer's field of view without actually removing viewer 610 from the eyeglass frames. However, normal operations such as seeing auxiliary readouts, operating control devices, using medical instruments, etc., are possible in average ambient lighting conditions without removing or repositioning the stereoscopic viewer.

An alternate embodiment for the portable stereoscopic viewer employs a conventional goggle design which conforms to facial contours. The goggles are of a size which is large enough to facilitate wearing without causing the observer to remove his own eyeglasses. Although efficient for eliminating background and reflected light, goggle type viewers are bulky and cannot be removed as easily as the previously described clip-on, flip-up embodiments. Nonetheless, goggle type viewers may be preferable in some applications. Yet another embodiment is to use standard eyeglasses frames with lenses totally or partially replaced with electro-optic shutter assembly affixed to the lenses of eyeglasses frames.

Figure 15:
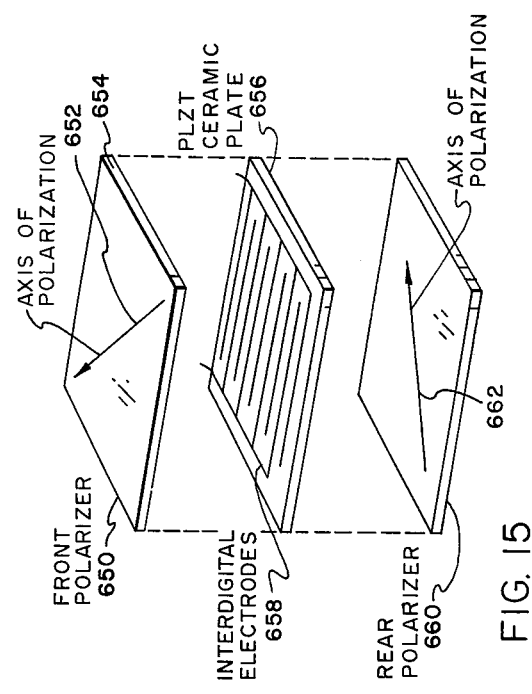
FIG. 15 is an exploded perspective view of a PLZT electro-optic shutter device for use with fluoroscopy systems of the instant invention.

Referring to FIG. 15, the details of an individual PLZT electro-optic shutter assembly are described. A front polarizer 650 has its axis of polarization oriented as shown by the arrow 652. Any satisfactory high contrast ratio polarizing material may be used for polarizer 650. However, polarizers known as "Mark's Polarizer Formula X-40", having a contrast ratio greater than 1000:1, have proven satisfactory. This polarizing material can be rigidly held adjacent to or cemented to a glass plate 654. The glass plate can be coated with magnesium fluoride or other material with like optical properties to suppress reflections at the air-glass interface. Alternately, the glass plate can be eliminated with the polarizing material being the front surface of the shutter assembly. The next element of the shutter assembly is a plate or wafer of lanthanum modified lead zirconate titanate ceramic 656 ground to the desired thickness. In operational models, these plates are of a 9/65/35 composition known as PLZT ceramic material. The descriptive numbers indicate proportional parts of the 5 constituent elements. The PLZT ceramic plates can be polished to a thickness of approximately fifteen mils and have electrodes 658 deposited thereon.

Electrodes 658 are of chromegold or other material of similar electrical characteristics. Transparent electrode materials such as tin oxide can also be used. The electrodes are deposited on a single side of PLZT ceramic plate 656 in the illustrated inter-digital pattern. Typical electrode width is three mils with forty mils spacing. The dimensions and placement of the electrodes make them essentially transparent to the observer, although other electrode widths and spacings known to the electro-optical arts may be used. Other mounting and electrode arrangements, such as depositing one set of electrodes on either side of the PLZT ceramic plate may also be used in accordance with good electro-optical design practice.

In order to minimize surface reflections at the polarizer-PLZT ceramic interfaces, additional anti-reflective coatings may be used on either side of PLZT ceramic plate 656.

The next element in the lens assembly, bottom polarizer 660 has its axis of polarization 662 at right angles to that of polarizer 650, as indicated by the arrow. Polarizers 650 and 660 are both oriented at an angle of forty-five degrees with respect to the electrode grid 658 deposited on PLZT ceramic plate 656, as illustrated. Other angular orientations of polarizers 650 and 660 with electrode grid 658 are also possible.

An alternate embodiment for the PLZT shutter lens assemblies would remove front polarizer 650 from each shutter of the stereoscopic viewer and place a large sheet of the polarizing material on the surface of a television monitor, such as the monitor 602 of FIG. 13. The orientation of the polarizing material on television monitor 602 would be the same as previously illustrated for the complete PLZT shutter assembly when the stereoscopic viewer was held in the horizontal plane relative to the television monitor surface. The main advantage of this implementation is that an observer may look away from television monitor 602 while wearing the stereoscopic viewer with a minimum of visual impairment. This is due to the optical shutter mechanism no longer being in effect, as the front polarizer has effectively been removed. A second advantage is that the stereoscopic viewer size and weight is reduced due to not containing a front polarizer. A significant disadvantage of this implementation is that slight head movements about the horizontal axis will produce television monitor and stereoscopic viewer polarizer alignments of other than ninety degrees. Consequently, the effective contrast ratio of the polarizer material is reduced and ghost image effects may appear.

To date, the best levels of operational performance for electro-optic shutter stereoscopic viewers have been achieved using PLZT ceramic light valves. However, other electro-optic materials can also be used. For example, nematic liquid crystals and dipolar fluids can be employed as electronically controlled light valves with a shutter assembly similar to that described for PLZT ceramics.

Figure 16:
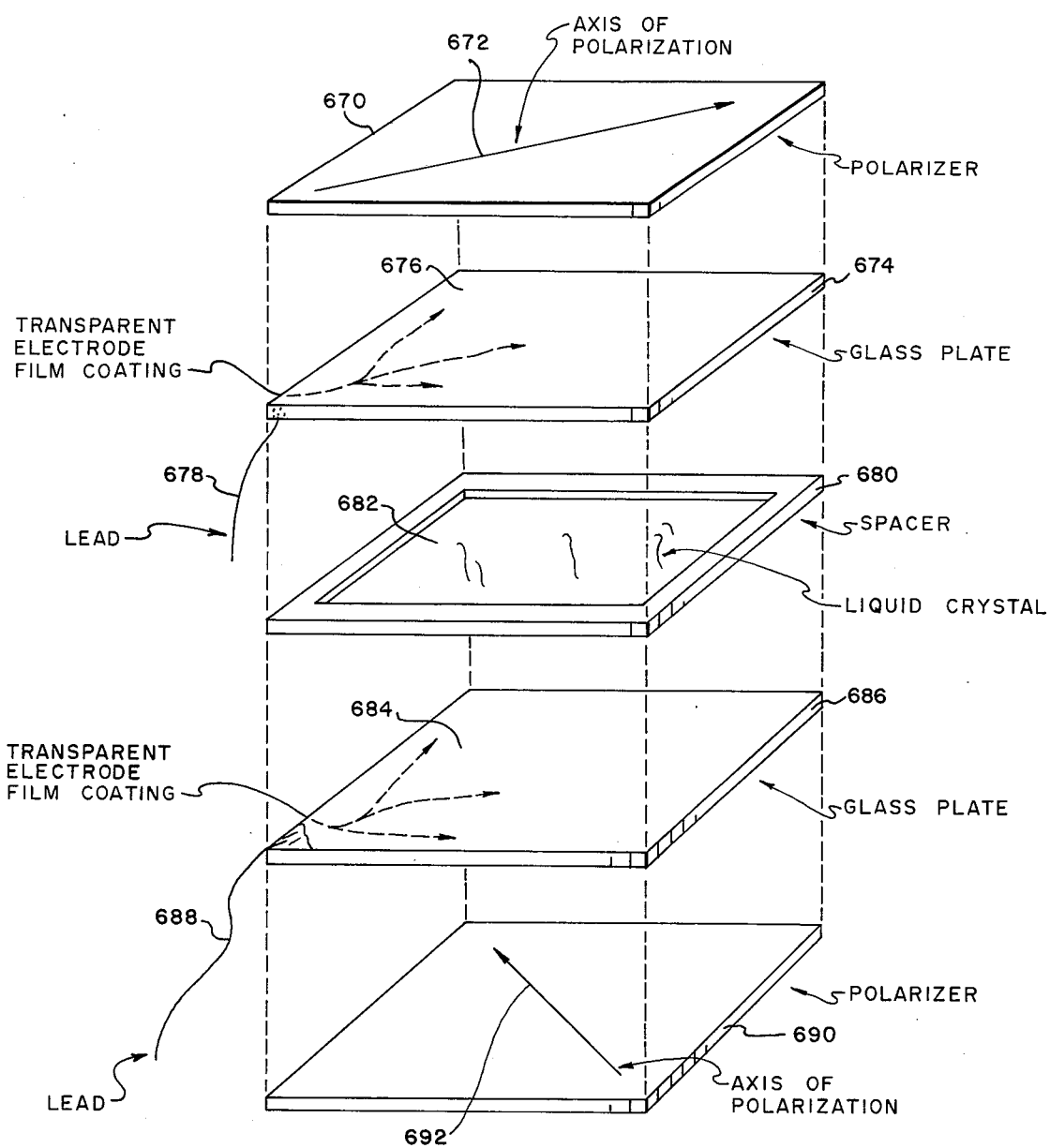
FIG. 16 is an exploded perspective view of a liquid crystal electro-optic shutter device for use with the fluoroscopy systems of the instant invention.

FIG. 16 illustrates a liquid crystal shutter assembly of the type employable. It has a front polarizer 670 which has an axis of polarization as shown by the arrow 672. The next element is a glass plate 674 having a transparent electrode film coating 676 secured thereto with a conductive lead 678 for connection to a shutter operating device. A spacer 680 is next with the liquid crystal material 682 therein. The spacer 680 is followed by another electrode coated 684 glass plate 686. The electrode material also has a lead 688 for connection to a shutter operating device. The bottom element is another polarizer 690 having an axis of polarization as shown by the arrow 692 normal to the axis of polarization 672 of the front or top polarizer 670.

In the embodiments described, the perceived vertical resolution is less than that of normal television as each eye sees only one of the interlaced fields. However, since the two fields are effectively merged by the persistency of the observer's vision, the resulting resolution loss is not as limiting as would appear from purely mathematical considerations. If required, higher resolution may be achieved by using systems having more lines of raster or by presenting the stereoscopically complementary images on alternating full frames. In this latter embodiment, stereoscopic viewer 610 is switched at the slower frame rate rather than the field rate.

These embodiments can also be used to view video tape recordings. This is possible because the video bandwidth requirements are identical to those of conventional interlace television systems. The video tape, including field synchronization information, can be fed directly into television monitor 602 for delayed stereoscopic television playback.

Also, it is possible to employ conventional television projection systems to project the video input to television monitor 602 onto a large viewing screen. By viewing the surface of the screen while wearing the stereoscopic viewer, the observer will see three-dimensional images in exactly the same manner as looking at television monitor 602.

For the systems herein disclosed, it may also be noted that the synchronization of the power supply for each X-ray tube with the field scan synchronization pulse of a television camera allows each X-ray tube to be energized coincidentally with the start of a television camera scan of a field. The duration of operation for each X-ray tube need only be long enough to provide an image on the image intensifier tube output screen suitable for scanning during one field interval by the television camera. Conventional blocking techniques may be employed to eliminate residual images on the output screen on the image intensifier tube, if desired. In the normal operating mode of this system a time sequence of alternating odd and even numbered line fields is produced by the television camera(s) and transmitted via a video link to the television monitor as hereinbefore discussed. A television monitor is synchronized with the television camera through the composite video signal and receives odd and even numbered line field which are displayed on the monitor in normal field sequential manner employed with conventional interlace raster television systems. The observer observes the three-dimensional picture by viewing through electrically controlled optical shutters or light valves as hereinbefore disclosed. Conventional two-dimensional presentations can also be achieved as herein disclosed by simply energizing the bypass switch. No modification to the basic configuration is required although it is no longer then necessary to use electro-optic shutter viewers while viewing a two-dimensional image.

The foregoing description taken together with the appended claims constitutes a disclosure such as to enable a person skilled in the electro-optics arts and having the benefit of the teachings contained herein to make and use the invention. Further, the structure herein described meets the aforestated objects of the invention and generally constitutes a meritorius advance in the art, unobvious to an artisan without the benefit of these teachings.

It is to be understood that the embodiments of the invention herein described are merely illustrative of the application of the principals of the invention. Reference herein to details of the illustrated embodiment is not intended to limit the scope of the claims which themselves recite those features regarded as essential to the invention.

We claim:

1. A stereoscopic fluoroscopy system comprising:
   a source of radiation to radiate an object;
   conversion means to receive radiated images reflective of said object from said source and to convert said images to a first electronic video signal and a second electronic video signal wherein each video signal is reflective of said object along respective lines of sight separated by a viewing angle;
   transmission means conductively connected to said conversion means to receive and transmit said video signals; and
   display means conductively connected to said transmission means to receive said video signals and generate optically viewable images reflective of said object, said display means including:
   a television monitor conductively connected to receive said video signals and generate said optically viewable images,
   synchronization detector means conductively connected to said transmission means to receive said video signals to detect video signal synchronization signal,
   means conductively connected to said synchronization,
   detector means to transmit said synchronization signal,
   a portable electro-optic shutter viewer having electro-optic shutters positionable proximate each eye of the viewer, means to receive said synchronization signal and means conductively connected thereto to alternatingly activate each electro-optic shutter in synchronization with said synchronization signal so that said viewer perceives a three-dimensional image.

2. The system of claim 1 wherein said means to transmit said synchronization signal is a radio transmitter to transmit a synchronization signal, and wherein said means to receive said synchronization signal of said portable electro-optic shutter viewer is comprised of:
   an antenna to receive said synchronization signal;
   switching logic connected to receive said synchronization signal from said antenna and connected to said electro-optic shutters to operate them; and
   a power supply comprised of a battery connected to a voltage converter, which is in turn connected to power said switching logic.

3. The system of claim 1 wherein said source of radiation is a pair of spaced apart X-ray tubes having lines-of-sight, and wherein said conversion means is a pair of spaced apart television cameras each positioned to optically receive radiation from one of said X-ray tubes along its respective line of sight.

4. The system of claim 1 wherein said conversion means includes a television camera with a 2:1 interlace and an image intensifier.

5. The system of claim 1 wherein said electro-optic shutters are made of a lanthanum modified lead zirconate titanate ceramic (PLZT) material.

6. The system of claim 1 wherein said electro-optic shutters are made of a nematic liquid crystal material.

7. The system of claim 1 wherein said electro-optic shutters are made of a dipolar fluid material.

8. The system of claim 1 further including:
   positioning means selectively associated with said object, said source and said conversion means to selectively position said object, said source and said conversion means at a first position to generate a first image and in turn said first video signal reflective of said object and at a second position to generate a second image and in turn said second video signal, said first and second positions being selected to generate said images along respective lines of sight separated by said viewing angle;
   a synchronization source conductively connected to said source of radiation and said conversion means to supply synchronization signals thereto to cause substantially periodic preselected simultaneous operation thereof; and
   controller means associated with said positioning means to generate and supply positioning signals to said positioning means as selected by the user.

9. The system of claim 8 wherein said synchronization source is external to said system and is an electro cardiogram device.

10. The system of claim 8 further including cursor means conductively connected to said controller means to receive positioning signals therefrom and conductively connected to said monitor, said cursor means being operable by a user to generate and supply a selectively movable three-dimensional cursor signal to said monitor for display thereby.

11. The system of claim 10 wherein said cursor means includes means to compute measurements from a selected frame of reference and means to display said computed measurements.

12. The system of claim 8 wherein said conversion means is a television camera having odd and even field scans and wherein said source of radiation is an X-ray tube.

13. The system of claim 12 wherein said transmission means includes:
   a field detector conductively connected to receive said video signals to detect the odd and even field scans and supply an odd and even field scan switch signal;
   a field scan logic to receive said even and odd field scan switch signals and to receive control signals from said controller to selectively transmit said odd and even field scan switch signals as selected by the user;
   a field scan switch to receive said video signals and to receive said field scan switching signals and to switch to supply even field scan signals from said first video signal and odd field scan signals from said second video signal; and
   a video storage device connected to receive said odd and even field scan signals and to supply an output video signal comprised of said odd and even field scan signals, said video storage device selectively storing said even and odd field scan signals until a new field scan signal is received from said conversion means.

14. The system of claim 13 wherein said controller means is conductively connected to said positioning means, to said source of radiation, and to said transmission means to supply control signals thereto, and wherein said controller includes means to supply control signals to said positioning means and to said source of radiation to cause said positioning means to operate to position said source and said conversion means at positions selected by the user and to activate said source, said means to supply control signals having modes of operation which include:
   automatic, in which said positioning means operates repetitive cycles to said positions and in which said source activates for a predetermined time at the selected positions; and
   manual, in which the positioning means operates to said positions only upon manual command by the user.

15. The system of claim 14 wherein said controller has means to control activation of said source when said controller is operating in the automatic mode in modes which include:
   continuous, in which said source is activated at said preselected positions repetitively until stopped by the user; and
   multi-frame, in which said source is automatically activated at said preselected positions for a preselected number of positions.

16. The system of claim 14 wherein said controller has means to control activation of said source when said controller is operating in the manual mode, said means being manual switching means operable by the user.

17. The system of claim 14 wherein said display means has phase reversing means conductively interconnected between said synchronization detector means and said means to transmit said synchronization signal, and wherein said controller has view switching means conductively connected to said phase reversing means, said view switching means being operable by the user to operate the phase reversing means and reverse the perceived view of the object from in front of the object to behind the object as perceived on the monitor by the user.

18. The system of claim 14 wherein said transmission means includes a bypass switch conductively connected so that when operated to close the video signals from the conversion means are supplied directly to said television monitor, and wherein said controller means has a mode switch conductively connected to said bypass switch and operable by the user to send signals to said bypass switch to cause it to close to obtain a two-dimensional presentation on said monitor and to cause it to open to obtain a three-dimensional presentation on said monitor.

19. The system of claim 14 wherein said display means includes a second video storage device conductively connected to receive the same input as said monitor and wherein said controller has a video storage device control panel conductively connected to said second video storage device, said control panel being operable by the user to supply control signals to said second video storage device.

20. In a conventional fluoroscopy system having a source of radiation to radiate an object, conversion means to receive radiated images reflective of said object from said source and to convert said images to electronic video signals and a television monitor connected to receive said video signals and generate an optically viewable image reflective of said object, the improvement comprising:
   positioning means selectively associated with said object, said source and said conversion means to selectively position said object, said source and said conversion means at a first position to generate a first image and in turn said first video signal reflective of said object and at a second position to generate a second image and in turn said second video signal, said first and second positions being selected to generate said images with said viewing angle reflective of said object;
   a synchronization source conductively connected to said source of radiation and said conversion means to supply synchronization signals thereto to cause substantially periodic preselected simultaneous operation thereof;
   conversion means to receive radiated images reflective of said object from said source and to convert said images to a first electronic video signal and a second electronic video signal wherein each video signal is reflective of said object along respective lines of sight separated by a viewing angle;
   transmission means conductively connected to said conversion means to receive and transmit said video signals; and
   display means conductively connected to said transmission means to receive said video signals and generate optically viewable images reflective of said object, said display means including:
      a television monitor conductively connected to receive said video signals and generate said optically viewable images,
      synchronization detector means conductively connected to said transmission means to receive said video signals to detect video signal synchronization signal,
      means conductively connected to said synchronization detector means to transmit said synchronization signal,
      a portable electro-optic shutter viewing having electro-optic shutters positionable proximate each eye of the viewer, means to receive said synchronization signal and means conductively connected thereto to alternatingly activate each electro-optic shutter in synchronization with said synchronization signal so that said viewer perceives a three-dimensional image.

21. The improvement of claim 20 wherein said electro-optic shutters are made of a lanthanum modified lead zirconate titanate ceramic (PLZT) material.

22. The improvement of claim 20 wherein said electro-optic shutters are made of a nematic liquid crystal material.

23. The improvement of claim 20 wherein said electro-optic shutters are made of a dipolar fluid material.

24. The improvement of claim 20 wherein said means to transmit said synchronization signal is a radio transmitter to transmit a synchronization signal, and wherein said means to receive said synchronization signal of said portable electro-optic shutter viewer is comprised of an antenna to receive said synchronization signal;

switching logic connected to receive said synchronization signal from said antenna and connected to said electro-optic shutters to operate them, and a power supply comprised of a battery connected to a voltage converter, which is in turn connected to power said switching logic.

25. The improvement of claim 20 wherein said conversion means includes a television camera with a 2:1 interlace and an image intensifier.

26. The improvement of claim 20 wherein said source of radiation is a pair of spaced apart X-ray tubes having lines-of-sight, and wherein said conversion means is a pair of spaced apart television cameras each positioned to optically receive radiation from one of said X-ray tubes along its respective line of sight.

27. The improvement of claim 20 wherein said transmission means includes:

a field detector conductively connected to receive said video signals to detect the odd and even field scans and supply an odd and even field scan switch signal;

a field scan logic to receive said even and odd field scan switch signals and to receive control signals from said controller to selectively transmit said odd and even field scan switch signals as selected by the user;

a field scan switch to receive said video signals and to receive said field scan switching signals and to switch to supply even field scan signals from said first video signal and odd field scan signals from said second video signal; and a video storage device connected to receive said odd and even field scan signals and to supply an output video signal comprised of said odd and even field scan signals, said video storage device selectively storing said even and odd field scan signals until a new field scan signal is received from said conversion means.

28. The improvement of claim 20 further comprising controller means associated with said positioning means to generate and supply positioning signals to said positioning means as selected by the user wherein said controller means is conductively connected to said positioning means, to said source of radiation, and to said transmission means to supply control signals thereto, and wherein said controller includes means to supply control signals to said positioning means and to said source of radiation to cause said positioning means to operate to position said source and said conversion means at positions selected by the user and to activate said source, said means to supply control signals having modes of operation which include:

automatic, in which said positioning means operates in repetitive cycles to said positions and in which said source activates for a predetermined time at the selected positions; and manual, in which the positioning means operates to said positions only upon manual command by the user.

29. The improvement of claim 28 wherein said controller has means to control activation of said source when said controller is operating in the automatic mode in modes which include:

continuous, in which said source is activated at said preselected positions repetitively until stopped by the user;

multi-frame, in which said source is activated at said preselected positions for a preselected number of positions; and wherein said controller has means to control activation of said source when said controller is operating in the manual mode, said means being manual switching means operable by the user; and wherein said display means has phase reversing means conductively interconnected between said synchronization detector means and said means to transmit said synchronization signal, and wherein said controller has view switching means conductively connected to said phase reversing means, said view switching means being operable by the user to operate the phase reversing means and reverse the perceived view of the object from in front of said object to behind said object as perceived on the monitor by the user.

30. The improvement of claim 28 further comprising cursor means conductively connected to said controller means to receive positioning signals therefrom and conductively connected to said monitor, said cursor means being operable by a user to generate and supply a selectively movable three-dimensional cursor signal to said monitor for display thereby, and wherein said cursor means includes means to compute measurements from a selected frame of reference and means to display said computed measurements.

* * * * *